Patented Sept. 18, 1951

2,567,918

UNITED STATES PATENT OFFICE 2,567,918

ALPHA-PINENE AND VINYL CYCLOHEXENE RESIN

Samuel G. Burroughs, Pittsburgh, Pa., assignor to Pennsylvania Industrial Chemical Corporation, Clairton, Pa., a corporation of Pennsylvania No Drawing. Application August 23, 1948,
Serial No. 45,784

7 Claims. (Cl. 260—88.1)

This invention relates to a resin composed of mixed vinyl cyclohexene and alpha-pinene polymers and/or copolymers.

1-vinyl cyclohexene-3 is produced as a derivative of cyclohexene formed as a by-product in certain catalytic processes, such as processes of making butadiene. As produced it is associated with cyclohexanol and related alcohols in a combined proportion of about 10% to 15% of those substances. This impure, approximately 85% vinyl cyclohexene polymerizes under the influence of aluminum chloride and related acid-reacting metal halide catalysts very slowly and incompletely to form two types of resin, one of which has a melting point of about 100 and is soluble in mineral spirits at normal room temperature, and the other of which is infusible and is insoluble in all commonly used organic solvents. These two types of resin are formed approximately simultaneously and separate from each other with precipitation of the insoluble type. Because of poor yield and the impossibility of directing the polymerization reaction, the impure cyclohexene is to be considered valueless as a starting material for the production of resin of either type. I have, however, found that by purifying the vinyl cyclohexene and by subjecting it to polymerization in association with alpha-pinene, I am able to obtain good yields of solid resins.

Any suitable purification procedure may be followed to obtain an approximately pure vinyl cyclohexene starting material. One specific procedure which I have advantageously followed is to wash the impure vinyl cyclohexene by-product with 59° Baumé sulphuric acid (74%) at 5° C. The product of the purification consists of about 95% pure vinyl cyclohexene responding apparently to the formula

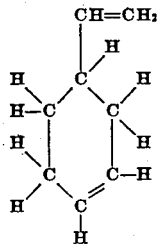

This acid washed vinyl cyclohexene has a specific gravity of 0.8336 at 15.5° C., a boiling range of 125° C. to 131° C., a bromine number of 280, and a refractive index of 1.464 at 20° C. This material when diluted with a hydrocarbon diluent, such as toluol, and subjected to a polymerization reaction with aluminum chloride, or its substantial equivalent as a catalyst, gives a yield of about 80% of infusible insoluble resin, and about a 20% yield of resin having a melting point of 80° C. (ball and ring) which is soluble in mineral sprits at normal room temperature. There is great diversity in the properties of the diverse types of resin so produced inasmuch as the extent in toluol, acetone, alcohol, ethyl-acetate, carbon tetrachloride, or mineral spirits, with heating. It also is not soluble in molten coumarone-indene resin, or molten terpene resin. The insoluble type of vinyl cyclohexene resin does not melt up to its decomposition point. A less carefully acid washed vinyl cyclohexene, which I also have used, is between 85% and 90% pure.

Whereas the two diverse resins of the insoluble and soluble types have each its individual utility, I have discovered that a more useful product is obtained by polymerizing a mixture of the vinyl cyclohexene, which as shown in the formula is a mixed cyclic and open chain material, with alpha-pinene to produce a soluble, thermoplastic resin. Apparently such resin is in part at least the result of copolymerization, inasmuch as up to a certain percentage of the vinyl cyclohexene only soluble polymers are formed and the resultant resin is obtained in higher yield and has a higher melting point than the theoretical average to be anticipated from the mixture.

Alpha-pinene is a turpentine constituent giving by itself relatively poor response to polymerization promoting stimuli, even when subjected to polymerization with the most active of the acid-reacting metallic halides. It is present in substantial proportion in gum spirits of turpentine derived by tapping live conifers and by distillation of the liquids thus obtained, being present in that turpentine in a proportion of about 70% thereof. It also is present in a proportion of about 60% of the whole in sulphate turpentine which is a liquid extracted from the waste produced in the process of making sulphate pulp from the wood of conifers. It is present in a proportion of about 40% in wood spirits of turpentine which is extracted from chips cut from the stumps of conifers. It is therefore the terpene which is quantitatively the most available. As commercially available from any of these sources the alpha-pinene which is sold as such is over 90% pure, varying with the methods used in its separation from the associated mono-cyclic and by-cyclic terpenes. It distills within the range of 150° C. to 160° C. (vapor temperature) and has an aniline point by the standard method of aniline point determination of about 46° C.

As polymerized by itself by bringing it into reactive contact with aluminum chloride or an equivalent acid-reacting halide, the commercial alpha-pinene, about 90% pure, gives an approximately 40% yield of terpene resin having a softening point (ball and ring) of about 50° C. to 70° C. When brought to a state of approximate purity, the alpha-pinene gives a slightly lower yield of terpene resin having a slightly lower softening point. By mixing alpha-pinene, in either an impure commercial exemplification of that material or a prepared alpha-pinene over 95% pure, with vinyl cyclohexene, a resin of higher softening point than is obtainable from alpha-piene by itself is obtained in a yield much greater than that obtained without inclusion of the vinyl cyclohexene. In mixtures of vinyl cyclohexene with alpha-pinene below the maximum permissible proportion of that material, approximately all of the vinyl cyclohexene which is included partakes in the formation of soluble thermoplastic resin without any substantial formation of insoluble polymers.

As a general procedure the vinyl cyclohexene which has been subjected to purification treatment is mixed with the alpha-pinene and with an organic diluent which is substantially inert to polymerization with the vinyl cyclohexene and the terpene, and is brought into reactive contact with an acid-reacting metal halide polymerization catalyst, such as anhydrous aluminum chloride, aluminum bromide, stannic chloride, titanium tetrachloride, antimony pentachloride, ferric chloride and the corresponding bromides of these latter metals, aluminum chloride and aluminum bromide being preferred. During the progress of the polymerization reaction, the reaction temperature is maintained within a range which desirably is suitable for relatively rapid polymerization without reaction surge, such as a temperature within the approximate range of 0° C. to 80° C., a temperature within the range of about 35° C. to 60° C. being considered optimum from the viewpoints of reaction speed and ease of temperature control. Upon the completion of catalyst addition, which desirably is effected without such rapidity as to cause a surge, agitation of the reaction mixture is continued for a substantial period of time completely to polymerize the vinyl cyclohexene and the alpha-pinene.

To remove the catalyst at the end of the polymerization treatment two standard recovery methods may be employed. In accordance with one such procedure the mixture is drowned with a 5% water solution of hydrochloric or sulphuric acid, and is then water washed and neutralized with a 10% water solution of sodium carbonate. The washed solution is then marmed to 60° C. and is allowed to settle until a clear resin solution is obtained. Such resin solution is distilled, desirably at a still temperature of about 210° C., and is then steam distilled at still temperatures within the range of about 210° C. to 260° C. until a resin of the desired softening point remains as a residue.

The other method of removing catalyst and recovering solid resin tends to give a somewhat lighter color than the method described above. In accordance with this latter procedure the polymerization mixture is allowed to settle until the metal halide sludge separates out, which separation is complete within about one hour to twenty-four hours. The solution is decanted off, the sludge is washed with a suitable organic solvent, such as refined solvent naphtha, and the washings are added to the resin solution. The combined resin solution thus obtained is clear, but is deep red in color due to the retention of a soluble complex of the metal halide. This clear but highly colored solution is purified by refluxing it at still temperature of about 140° C. to 150° C. with fuller's earth having but slight acidity, which is not of necessity dry, and slacked time for a period of three hours. During this treatment hydrochloric acid is driven off and the original soluble aluminum chloride complex comes down as a precipitate. An appropriate quantity of clay for use in the reflux purification is about 7.5% of the total weight of vinyl cyclohexene and alpha-pinene and a quantity of lime equal to the weight of the clay desirably is used. As low as 5% clay and lime may be used and as much may be used as will not interfere with the refluxing. Up to as much as 15% to 20% each of clay and lime is usable. After refluxing, the resin solution is filtered and a clear light yellow resin solution is obtained, one of the common commercial filter aids desirably being used during the filtering. This resin solution is then steam distilled, desirably at still temperatures of about 210° C. to 260° C., until solid resin of the desired melting point remains as a residue.

The above recovery procedure results in the production of a resin of particularly light color, but does so at the sacrifice of a small proportion of the resin yield which is retained in the sludge initially separated from the resin solution. This proportion of the resin carried down with the sludge may largely be recovered by drowning the sludge with a 5% water solution of hydrochloric acid or sulphuric acid, then agitating the resin with an organic solvent, such as distilled solvent naphtha, and distilling off the solvent. This leads to recovery of entrapped resin which is of darker color than that obtained by steam distillation of the resin solution.

It has been noted that the mixture of vinyl cyclohexene and alpha-pinene is diluted with an organic solvent diluent inert to polymerization under conditions of the process. That diluent preferably is one of the low aniline point organic solvents which is inert in the process, as for example one of the aromatic hydrocarbon solvents which have no unsaturation outside the benzene ring, such as benzol, toluol, xylol, refined solvent naphtha and ethyl benzene, or one of the chlorinated aromatic solvents, such as chlorobenzol.

Regardless of the specific solvent which is used, most desirably it is included in a quantity not substantially less than 30% the total reaction liquid in order to maintain activity as polymer formation proceeds. It can be included in any greater quantity subject to the practical consideration that increased volume of diluent tends to slow the reaction and to increase the reaction time, and also to require that an increased quantity of catalyst be used in order to make reactive contact with the polymerizable vinyl cyclohexene and alpha-pinene. Also it is uneconomical to use and distill off more diluent than performs a useful purpose during the polymerization reaction. As a practical consideration I prefer to include the diluent in no more than about 80% of the total volume of the reaction mixture.

I have found that in using anhydrous aluminum chloride or aluminum bromide as the polymerization catalyst as little as 2% by weight of such catalyst with respect to the combined weight of the vinyl cyclohexene and alpha-pinene is sufficient to effect complete polymerization, and even less than 2% may usefully be employed. Preferably I utilize anhydrous aluminum chloride or aluminum bromide in a quantity equal to about 4% to 15% the weight of the combined vinyl cyclohexene and alpha-pinene in accordance with the other conditions of the process. Quantities of those catalysts over 25% effect no appreciable shortening in the time required for the polymerization reaction even when conduct of the polymerization at low temperature indicates the use of a relatively large proportion of catalyst, unless a particularly great volume of diluent also be used. In proportioning the catalyst to the polymerizable constituents of a reaction mixture the other metal halide catalysts of the Friedel-Crafts type which have been noted above can usefully be proportioned to the above preferred quantities of anhydrous aluminum chloride and aluminum bromide. In substituting aluminum bromide and the other metal halide catalysts for the aluminum chloride, the optimum proportion of catalyst to the polymerizable content of the reaction mixture is desirably increased or decreased with respect to the quantity of aluminum chloride used in proportion as the molecular weight of that particular catalyst is greater or less than that of aluminum chloride.

It has been noted above that in subjecting a mixture of vinyl cyclohexene and alpha-pinene to polymerization the vinyl cyclohexene functions in the mixture to raise the melting point of the resin which may be recovered. It is to be noted that this function is performed down to the least proportion of vinyl cyclohexene which gives a perceptible increase. That minimum proportion is, as will be exemplified herein, below 15% of vinyl cyclohexene in the mixture of that material with alpha-pinene, if in fact there is any proportion which may be considered as an absolute minimum exerting no measurable effect on the product resin. For purposes of practical definition of the point at which the effect of including vinyl cyclohexene becomes negligible, I give 10% as a minimum. In seeking to obtain resin of particularly high melting point the proportion of vinyl cyclohexene to alpha-pinene can be increased for the production of high melting thermoplastic resin up to a point at which the proportion of insoluble polymers renders further increase in the proportion of the vinyl cyclohexene uneconomical. I have found that the best average results with respect to the softening point of the thermoplastic resin which is produced and the yield of such thermoplastic resin are obtained when the vinyl cyclohexene constitutes about 25% to 45% of the polymerizable mixture, there being a substantial production of insoluble resin when equality in the weights of the two ingredients is approached with rapid increase above that point.

My starting material for polymerization thus comprises a mixture of alpha-pinene and vinyl cyclohexene in which the vinyl cyclohexene is included in a proportion of from 10% to 50% of the total blend and most desirably in a proportion of from 25% to 45% of the blend in order to obtain maximum inclusion of vinyl cyclohexene in the resin polymers without forming insoluble polymers, the proportions being by weight. This proportioning includes those blends in which the alpha-pinene is over 95% pure as well as those in which the alpha-pinene is about 90% pure.

The following will exemplify the method of my invention.

*Example 1*

In this example the vinyl cyclohexene forming an element of the blended starting material was about 90% pure figured on the basis of total unsaturation in accordance with its bromine number. The alpha-pinene was approximately 90% pure, and distilled over 90% within the range of 150° C. to 160° C. (vapor temperature). The vinyl cyclohexene had been pretreated with 59° Baumé sulphuric acid neutralized and washed with water. The alpha-pinene when subjected to polymerization by itself under the influence of anhydrous aluminum chloride gave a 40% yield of 70° C. (ball and ring) softening point terpene resin. The reaction mixture was made up by blending 100 cc. (83 gm.) of vinyl cyclohexene and 140 cc. (120 gm.) of the alpha-pinene with 300 cc. of toluol. 16 gm. of anhydrous aluminum chloride was added as catalyst and was brought with agitation into reactive contact with the vinyl cyclohexene and alpha-pinene of the reaction liquid. The catalyst was added to the reaction mixture in small increments during a period of 1 hour and after addition of the catalyst was complete the reaction mixture was stirred for an additional period of 2 hours. During the reaction the temperature was held by circulation of heat abstracting liquid through cooling jackets to a range of 35° C. to 45° C. No insoluble resin was formed.

At the end of the polymerization treatment the reaction mixture was warmed to 60° C., was allowed to settle and a clear solution was decanted away from the sludge. That sludge was drowned with a 5% water solution of hydrochloric acid and was agitated with distilled solvent naphtha. The solution from the sludge was added to the original solution. This entire resin solution was refluxed with clay and lime and was filtered. The filtered solution was distilled to 210° C. (still temperature) and was steam distilled at a still temperature of from 210° C. to 260° C. until a residue of solid resin was obtained.

The resin recovered by distillation was in a yield of 172 gm. (84.6) of thermoplastic soluble resin having a softening point of 116° C. (ball and ring) and a color 4 on the Gardner scale. This latter resin when dissolved in an equal proportion by weight of mineral spirits showed no cloud down to a temperature of 0° C.

*Example 2*

In this example the vinyl cyclohexene had been brought to a purity of about 95% and the alpha-pinene was of the same grade as in Example 1. They were blended in the proportion of 122 cc. (100 gm.) of vinyl cyclohexene and 118 cc. (101 gm.) of alpha-pinene. This reactive blend was mixed with 300 cc. of toluol to form the reaction mixture. To this reaction liquid 16 gm. of anhydrous aluminum chloride was added as catalyst and was brought with agitation into reactive contact with the vinyl cyclohexene and alpha-pinene of the reaction liquid. As in the foregoing example, the aluminum chloride was added to the reaction mixture in small increments during a period of 1 hour, and after addition of the catalyst was complete the reaction mixture was stirred for an additional period of 2 hours. During the reaction the temperature was held by circulation of heat abstracting liquid through cooling jackets to a range of 35° C. to 45° C. Insoluble resin in the amount of 6 gm. was formed.

The recovery procedure was identical to that of Example 1.

The resin recovered by distillation was 164.2 gm. (82.1%) of thermoplastic soluble resin having a softening point of 106° C. (ball and ring) and a color 5 on the Gardner scale. This latter resin when dissolved in an equal proportion by weight of mineral spirits showed no cloud down to a temperature of 0° C.

It may be noted that the foregoing example exemplifies the approximate maximum proportion of vinyl cyclohexene which desirably can be included in producing a thermoplastic resin from a mixed starting material consisting of alpha-pinene and vinyl cyclohexene.

Example 3

A starting material was made by mixing vinyl cyclohexene and alpha-pinene of the same grades used in Example 2. The mixture was made up of 48 cc. (42 gm.) of the vinyl cyclohexene and 215 cc. (182 gm.) of the alpha-pinene. This liquid was mixed with 300 cc. of toluol. 20 gm. of anhydrous aluminum chloride was added during a period of 1 hour and was brought with agitation into reactive contact with the vinyl cyclohexene and alpha-pinene of the reaction liquid. The reaction mixture was stirred for an additional period of 2 hours. During the reaction the temperature was held within the range of 40° C. to 45° C.

The recovery procedure was identical with that of Example 1.

The resin recovered by distillation was a thermoplastic soluble resin having a softening point (ball and ring) of 92° C. and a color 6 on the Gardner scale. The yield of solid thermoplastic resin, no insoluble resin being formed, was 180 gm. (80%) the weight of the combined vinyl cyclohexene and alpha-pinene. The resin when dissolved in an equal proportion by weight of mineral spirits showed no cloud down to a temperature of 0° C.

The foregoing exemplifies the fact that a relatively small proportion of vinyl cyclohexene when blended with alpha-pinene materially effects the results of the polymerization. The result of including with the alpha-pinene only a small proportion of the vinyl cyclohexene is therefore to obtain an appreciably increased yield of a resin of appreciably higher softening point with respect to the yield and softening point obtained by polymerizing the alpha-pinene alone.

Example 4

In this example vinyl cyclohexene and alpha-pinene of the same grades as those used in Example 1 were mixed. The reaction mixture was made up by mixing 144 cc. (116 gm.) of vinyl cyclohexene and 140 cc. (120 gm.) of the alpha-pinene with 300 cc. of toluol and 28 gm. (12%) aluminum chloride was added as the catalyst and was brought with agitation into reactive contact with the vinyl cyclohexene and alpha-pinene of the reaction liquid. The catalyst was added to the reaction mixture in small increments during a period of 1 hour and after addition of the catalyst was completed the reaction mixture was stirred for an additional period of 12 hours. During the reaction the temperature was held by circulation of heat abstracting liquid through cooling jackets to a range of 20° C. to 30° C.

At the end of the polymerization treatment the reaction mixture was settled for ½ hour, the solvent layer was decanted and drowned with 5% water solution of hydrochloric acid, was water washed and was neutralized with 10% sodium carbonate. This resin solution was warmed to 60° C., was allowed to settle and a clear solution was decanted. Because of the lower temperature at which the polymerization was conducted there was a greater precipitation of sludge than resulted from the polymerization in Examples 1, 2 and 3. This sludge was drowned with a 5% water solution of hydrochloric acid and was agitated with distilled solvent naphtha. The solution from the sludge was added to the original decanted solution, was distilled to a still temperature of 210° C. and was steam distilled at a still temperature of from 210° C. to 260° C. until a residue of solid resin was obtained. Insoluble resin in the amount of 8 gm. was formed.

The resin recovered by distillation was 194 gm. (82%) of thermoplastic soluble resin having a softening point of 122° C. (ball and ring) and was color C-3 on the Barrett scale. This latter resin when dissolved in an equal proportion by weight of mineral spirits showed no cloud down to a temperature of 0° C.

Example 5

Vinyl cyclohexene and alpha-pinene of the same grades as in Examples 2 and 3 were mixed in the proportion of 100 cc. (83 gm.) of vinyl cyclohexene and 140 cc. (120 gm.) of alpha-pinene and were mixed with 300 cc. of toluol to form the reaction mixture. To this reaction liquid 24 gm. (12%) of anhydrous aluminum chloride was added as the catalyst and was brought with agitation into reactive contact with the vinyl cyclohexene and alpha-pinene of the reaction liquid.

The polymerization procedure save as to the quantity of catalyst was identical with that described in Example 4. The recovery procedure was identical with that of Example 1.

The resin recovered by distillation was a thermoplastic soluble resin having a softening point of 126° C. (ball and ring) and a color 4 on the Gardner scale. The yield was 170 gm. (83%) of resin which when dissolved in an equal proportion by weight of mineral spirits showed no cloud down to a temperature of 0° C. No insoluble resin was formed.

Example 6

Vinyl cyclohexene and alpha-pinene of the same grades as in Examples 2, 3 and 5 were mixed in the proportion of 48 cc. (42 gm.) of vinyl cyclohexene and 215 cc. (182 gm.) of alpha-pinene and were mixed with 300 cc. of toluol to form the reaction mixture. To this reaction liquid 24 gm. (12%) of anhydrous aluminum chloride was added as the catalyst and was brought with agitation into reactive contact with the vinyl cyclohexene and alpha-pinene of the reaction liquid.

The polymerization procedure was identical with that described in Example 4. Because of the relatively great proportion of alpha-pinene included in the reaction liquid the precipitation of sludge was much less than in Examples 4 and 5. The sludge was, however, included in order to insure that all recoverable resin was included in the yield. The resin recovery was as described in Example 1.

The resin recovered by distillation was a thermoplastic soluble resin having a softening point of 86° C. (ball and ring) and was color 6 on the Gardner scale. The yield of solid thermoplastic resin, no insoluble resin being formed, was 172 gm. (76%) the weight of the combined vinyl cyclohexene and alpha-pinene. The resin when dissolved in an equal proportion by weight of mineral spirits showed no cloud down to a temperature of 0° C.

The foregoing Examples 4, 5 and 6 illustrate the fact that with lower reaction temperature it is desirable to use an increased quantity of catalyst and to continue the polymerization period for an extended length of time in order to secure results close to those obtained at higher temperature. As noted above the vinyl cyclohexene is relatively sluggish in its response to polymerization promoting stimuli. It will be noted that in Examples 4, 5 and 6 in which respectively the proportioning of vinyl cyclohexene and alpha-pinene is identical with that of Examples 1, 2 and 3 the lower temperature of polymerization gives a resin of somewhat higher softening point, obtained in slightly decreased yield. At the expense of an even more extended reaction period the polymerization at the lower temperature gives an almost equal yield of resin as compared with the higher temperature, while obtaining the benefit of higher softening point.

Using the same proportions of vinyl cyclohexene and alpha-pinene as in Examples 1, 2 and 3 polymerization was conducted at a temperature within the range of 10° C. to 15° C. In each instance catalyst in a quantity equal to 18% the weight of the combined vinyl cyclohexene and alpha-pinene was used and the polymerization period after addition of the catalyst was extended to 18 hours. The result was to obtain yields approximately identical with those of Examples 4, 5 and 6 with an increase of about 4° C. in the softening point of the resin. Duplication of the procedures given above but using aluminum bromide instead of aluminum chloride as catalyst gave almost identical results. The other acid-reacting metal halides are usable in the process. Even when employed in increased quantity they give lower yields of resin.

In all the foregoing examples the alpha-pinene is a commercial, about 90% pure, terpene which was not subjected to special purifying treatment. By using an alpha-pinene which had been brought to over 95% purity and which therefore contains no appreciable content of beta-pinene or dl-limonene, I obtain a yield which in each instance is slightly lesser and a softening point which is slightly lower.

The resin produced from a mixed vinyl cyclohexene and alpha-pinene starting material corresponds in most particulars to terpene resins. In all proportioning of the two ingredients of the starting material the resin is usable in all ways in which a straight terpene resin is usable, as for example in coating compositions, hot melt coatings, adhesive, rubber compounding, chewing gum bases and the like. Guides to satisfactory procedure in such uses are found in patents to Frank W. Corkery and Samuel G. Burroughs No. 2,320,717; No. 2,319,389; No. 2,320,716; No. 2,320,718; and No. 2,357,811.

Although terpene resins as carefully produced are considered to possess good color stability, the resin produced by polymerizing a mixture of vinyl cyclohexene and alpha-pinene exhibits higher resistance to color development than do the straight terpene resins, including straight beta-pinene resin.

It has been noted above that it is desirable in the process to use an inert solvent diluent of low aniline point. I have found it preferable to use such solvent diluents as have an A. S. T. M. D611-46T aniline point no higher than 35° C. Most of the commercially desirable solvents of this sort have aniline points by the above determination falling within the range of about 15° C. to 35° C.

Throughout the specification "aniline point," where not specifically qualified by the method of its determination, is to be understood as determined by the A. S. T. M. D611-46T aniline point method. Where not specifically qualified in the specification, "softening point" is to be understood as determined by the ball and ring method of softening point determination. Where not specifically qualified in the specification, distillation temperatures are to be understood as taken at 750 mm. of mercury. Where not specifically qualified proportions are to be understood as proportions by weight. In any example in which the formation of insoluble resin is not noted, no insoluble resin was formed.

In my companion application Serial No. 45,783, filed of even date herewith, I have disclosed the polymerization of mixtures of turpentines which contain alpha-pinene with the defined cyclic mono-olefine in which a vinyl group is substituted. Herein the disclosure relates to the polymerization of a mixture of alpha-pinene as such with the defined cyclic mono-olefine, 1-vinyl cyclohexene-3, designated through the specification simply as vinyl cyclohexene, and to the resins produced by that polymerization.

I claim as my invention:

1. The method of producing hard resin polymers by bringing a mixture of 1-vinyl cyclohexene-3 (cyclic dimer of butadiene) and a compound consisting of alpha-pinene in a proportion of vinyl cyclohexene equal to from 10% to 50% the weight of the blend into reactive contact with an acid-reacting metal halide polymerization catalyst in the presence of an inert solvent diluent for the polymers of the said vinyl cyclohexene and alpha-pinene, to form hard resin polymers of vinyl cyclohexene and alpha-pinene in solution, and recovering the resin polymers so formed.

2. The method of producing hard resin polymers by bringing a mixture of 1-vinyl cyclohexene-3 (cyclic dimer of butadiene) and a compound consisting of alpha-pinene in a proportion of vinyl cyclohexene equal to from 25% to 45% the weight of the blend into reactive contact with an acid-reacting metal halide polymerization catalyst in the presence of an inert solvent diluent for the polymers of the said vinyl cyclohexene and alpha-pinene, to form hard resin polymers of vinyl cyclohexene and alpha-pinene in solution, and recovering the resin polymers so formed.

3. The method of producing hard resin polymers by bringing a mixture of 1-vinyl cyclohexene-3 (cyclic dimer of butadiene) and a compound consisting of alpha-pinene in a proportion of vinyl cyclohexene equal to from 10% to 50% the weight of the blend into reactive contact with aluminum chloride polymerization catalyst in the presence of an inert solvent diluent for the polymers of the said vinyl cyclohexene and alpha-pinene, to form hard resin polymers of vinyl cyclohexene and alpha-pinene in solution, and recovering the resin polymers so formed.

4. The method of producing hard resin polymers by bringing a mixture of 1-vinyl cyclohexene-3 (cyclic dimer of butadiene) and a compound consisting of alpha-pinene in a proportion of vinyl cyclohexene equal to from 10% to 50% the weight of the blend into reactive contact with aluminum bromide polymerization catalyst in the presence of an inert solvent diluent for the polymers of the said vinyl cyclohexene and alpha-pinene to form hard resin polymers of vinyl cyclohexene and alpha-pinene in solution, and recovering the resin polymers so formed.

5. The method of producing hard resin polymers by bringing a mixture of 1-vinyl cyclohexene-3 (cyclic dimer of butadiene) and a compound consisting of alpha-pinene in a proportion of vinyl cyclohexene equal to from 25% to 45% the weight of the blend into reactive contact with aluminum chloride polymerization catalyst in the presence of an inert solvent diluent for the polymers of the said vinyl cyclohexene and alpha-pinene to form hard resin polymers of vinyl cyclohexene and alpha-pinene in solution, and recovering the resin polymers so formed.

6. The method of producing hard resin polymers by bringing a mixture of 1-vinyl cyclohexene-3 (cyclic dimer of butadiene) and a compound consisting of alpha-pinene in a proportion of vinyl cyclohexene equal to from 25% to 45% the weight of the blend into reactive contact with aluminum bromide polymerization catalyst in the presence of an inert solvent diluent for the polymers of the said vinyl cyclohexene and alpha-pinene to form hard resin polymers of vinyl cyclohexene and alpha-pinene in solution, and recovering the resin polymers so formed.

7. The resin produced by the process of claim 1.

SAMUEL G. BURROUGHS.

REFERENCES CITED

The following references are of record in the file of this patent:

UNITED STATES PATENTS

| Number | Name | Date |
|---|---|---|
| 2,346,791 | Rummelsburg | Apr. 18, 1944 |
| 2,349,210 | Traylor | May 16, 1944 |
| 2,383,084 | Rummelsburg | Aug. 21, 1945 |
| 2,401,414 | Doumani | June 4, 1946 |
| 2,475,234 | Gleason et al. | July 5, 1949 |
| 2,487,898 | Rummelsburg | Nov. 15, 1949 |

FOREIGN PATENTS

| Number | Country | Date |
|---|---|---|
| 614,781 | Great Britain | Dec. 22, 1948 |

OTHER REFERENCES

Laitinen et al.: Ind. & Eng. Chem., Analytic Ed., vol. 17, pp. 769–772 (1945).